Feb. 21, 1967 R. C. CARLSON 3,305,238

PHONOGRAPHIC APPARATUS

Filed May 18, 1964

7 Sheets-Sheet 1

INVENTOR
Reuben C. Carlson
BY Silverman + Cass
ATTORNEYS.

INVENTOR.
Reuben C. Carlson
BY Silverman + Cass
ATTORNEYS.

Feb. 21, 1967 R. C. CARLSON 3,305,238

PHONOGRAPHIC APPARATUS

Filed May 18, 1964 7 Sheets-Sheet 3

INVENTOR
Reuben C. Carlson
BY Silverman + Cass
ATTORNEYS.

Feb. 21, 1967 R. C. CARLSON 3,305,238

PHONOGRAPHIC APPARATUS

Filed May 18, 1964 7 Sheets-Sheet 4

INVENTOR.
Reuben C. Carlson
BY Silverman + Cass
ATTORNEYS.

Feb. 21, 1967 R. C. CARLSON 3,305,238

PHONOGRAPHIC APPARATUS

Filed May 18, 1964 7 Sheets-Sheet 5

INVENTOR.

Reuben C. Carlson

BY Silverman & Cass

ATTORNEYS.

Feb. 21, 1967 R. C. CARLSON 3,305,238

PHONOGRAPHIC APPARATUS

Filed May 18, 1964 7 Sheets-Sheet 6

INVENTOR.
Reuben C. Carlson
BY Silverman + Cass
ATTORNEYS.

Feb. 21, 1967 R. C. CARLSON 3,305,238

PHONOGRAPHIC APPARATUS

Filed May 18, 1964

7 Sheets-Sheet 7

INVENTOR
Reuben C. Carlson
BY Silverman + Cass
ATTORNEYS.

United States Patent Office 3,305,238
Patented Feb. 21, 1967

3,305,238

PHONOGRAPHIC APPARATUS

Reuben C. Carlson, Bensenville, Ill., assignor to Fray Products, Inc., Franklin Park, Ill., a corporation of Illinois Filed May 18, 1964, Ser. No. 368,301
27 Claims. (Cl. 274—10)

This invention relates generally to phonographic apparatus and more particularly concerns a phonographic apparatus having novel cycling means operable by drive means independent of the turntable drive means. The invention is especially directed to cycling means capable of sensing the diameter of the record to be played and placing the tone arm stylus on said record at the proper lead-in groove for said record. Said cycling means also includes a plurality of novel operational mechanisms, cooperatively coupled to perform the various necessary functions of said apparatus with a high degree of efficiency.

Phonographic apparatus of the character with which the invention is primarily concerned must include various mechanisms to perform certain required functional operations in a cyclic operational sequence. Mechanisms must be included which permit one or more records seriatim to be mounted upon a rotating turntable and tracked by a stylus-carrying cartridge mounted upon a stylus arm or the like. The stylus arm must be freely movable during the playing of the record but must be lifted from the record at the conclusion of play to be returned to its position assumed at the initiation of the cycle. A mechanism must be provided to poise one or more records above the turntable and drop same one at a time seriatim to the rotating turntable. Such last mentioned means must be operationally synchronized with the guided and driven movements of the stylus arm both prior to and upon completion of the playing of a record whereby the stylus arm will clear the turntable prior to the drop of the next record thereupon so as not to interfere with the dropping of said record.

The phonographic apparatus with which the invention is concerned should be operationally capable of playing a plurality of records in sequence even where the records are intermixed in diameter. Said cycling mechanism should be operational automatically once the records have been mounted for play seriatim and the apparatus initially energized. The apparatus must further include perch means for the stylus arm during the period the stylus arm is at rest. The apparatus further must function to deenergize itself subsequent to the play of the last record but must also be capable of repeated play of the last-to-play record.

Heretofore apparatus of the character described included highly complicated mechanisms and linkages in order to perform the above mentioned necessary functions. The drive means commonly encountered consisted of a single motor which was required to drive not only the turntable but also to drive the cycling mechanism as well. In many instances, prior mechanisms were prone to jamming upon the slightest deviation from the prescribed movement of each of the elements thereof. These mechanisms utilized generally complicated mechanical linkages and cams which could not be made simple enough to eliminate jamming and were not capable of remote controlled operation. Normally peak loads were encountered upon the single motor which would damage idlers of ordinary phonograph mechanisms, cause stalls and variations in the speed at which the turntable was rotated, required expensive drive means, undue differences in comparative cycle times for varying turntable speeds and other disadvantages inherent in the use of a single drive means were encountered.

With the above mentioned functional requirements in mind, it is the principal object of this invention to provide a phonographic apparatus having novel operational mechanisms cooperatively coupled to perform the above mentioned functions and coordinated sequential operations with efficiency far greater than encountered in prior devices.

Another object of the invention is to provide a phonographic apparatus which is capable of being remotely controlled and includes novel cycling means operated independently of the turntable and capable of guiding and driving the stylus arm to seat the stylus in the proper lead-in groove regardless of the diameters of the records and the intermixture of different diameter records.

A further object of the invention is to provide, in a phonographic apparatus of the character described, novel cycling means capable of guiding and driving the stylus arm to set-down the stylus in the proper groove of the record gently and in a cyclic operational sequence and to perform its functions at a relatively uniform interval regardless of the rotational speed of the turntable.

Still another object of this invention is to provide phonographic apparatus of the character described having an independently operated turntable and cycling means; perch means for said stylus arm capable of locking or clamping fixedly the stylus arm during the deenergized condition of the turntable, said perch means including an actuating lever for said apparatus to eliminate the heretofore encountered visually identifiable control means for the apparatus such as for the "on," "off" and/or "reject" conditions.

A still further object of the invention is the provision of cycling means for a phonograph apparatus of the character described which may be energized and controlled by the actuation of simple electrical switching means whereby remote controlled operation of such apparatus is made possible.

Another object of the invention is the provision of novel cycling means for a phonographic apparatus which comprises a cam and follower construction for guiding the stylus arm and placing the stylus in the proper lead-in groove of a record depending upon the diameter of said record, actuating means for driving the stylus arm, indexing means for determining the set-down position of the stylus arm dependent upon the diameter of the record to be played, and sensing means to determine the diameter of the record to be played. The invention also provides means coupled with said cam and follower construction for actuation of a conventional spindle assembly operatively synchronized to permit the stylus arm to clear the record prior to the drop of the next-to-play record upon the turntable.

With respect to the cam-follower construction of the invention, the invention further provides compensation means which enables manual override of the coupling between the stylus arm and the guiding and driving means therefor without normally encountered jamming, fracture of couplings and the like.

Another object of the invention is to provide a cycling means for phonographic apparatus of the character described which permits very broad tolerances on the various parts of the mechanism, relative insensitivity to the normal wear on said parts and a tolerance for poor assembly and servicing procedures.

A still further object of the invention is the provision of a cycling mechanism for phonographic apparatus of the character described which includes novel record sensing means operable in part from the speed selector control of the phonographic apparatus and in part by lever means directly responsive to the diameter of the record.

Still another object of the invention is to provide, in a cycling mechanism for a phonograph, means for determining when the last-to-play record is dropped to the turntable and, subsequent to the completion of play of said last-to-play record, functions to cause deenergization of the phonographic apparatus.

A further object of the invention is the provision of a phonographic apparatus having means to replay the last-to-play record of any predetermined record diameter regardless of whether the last-to-play record be the only record on the turntable or the top one of a group of records of intermixed diameter, said means capable of biasing the cycling means of the invention for proper positioning of the stylus for replay of a predetermined one of said records. In contrast, prior phonograph constructions are not always capable of replaying any of a given size records which may reside on the top of a stack of mixed diameter records.

The invention also has as important object thereof, the provision of phonographic apparatus capable of being manufactured of relatively simple components; which is simple as to the organization, character of its mechanical and electrical components and servicing; which is capable of manufacture in reduced scale embodiments packageable in relatively small volume containers; which is foolproof in operation whereas to enable operation thereof by persons of all ages; and, which affords substantial protection to the records played.

Still other objects and advantages of the invention shall become apparent as a detailed description thereof proceeds hereinafter with reference to the accompanying drawings. Like reference numbers have been utilized in the various figures to denote like or similar parts.

Figure 1:
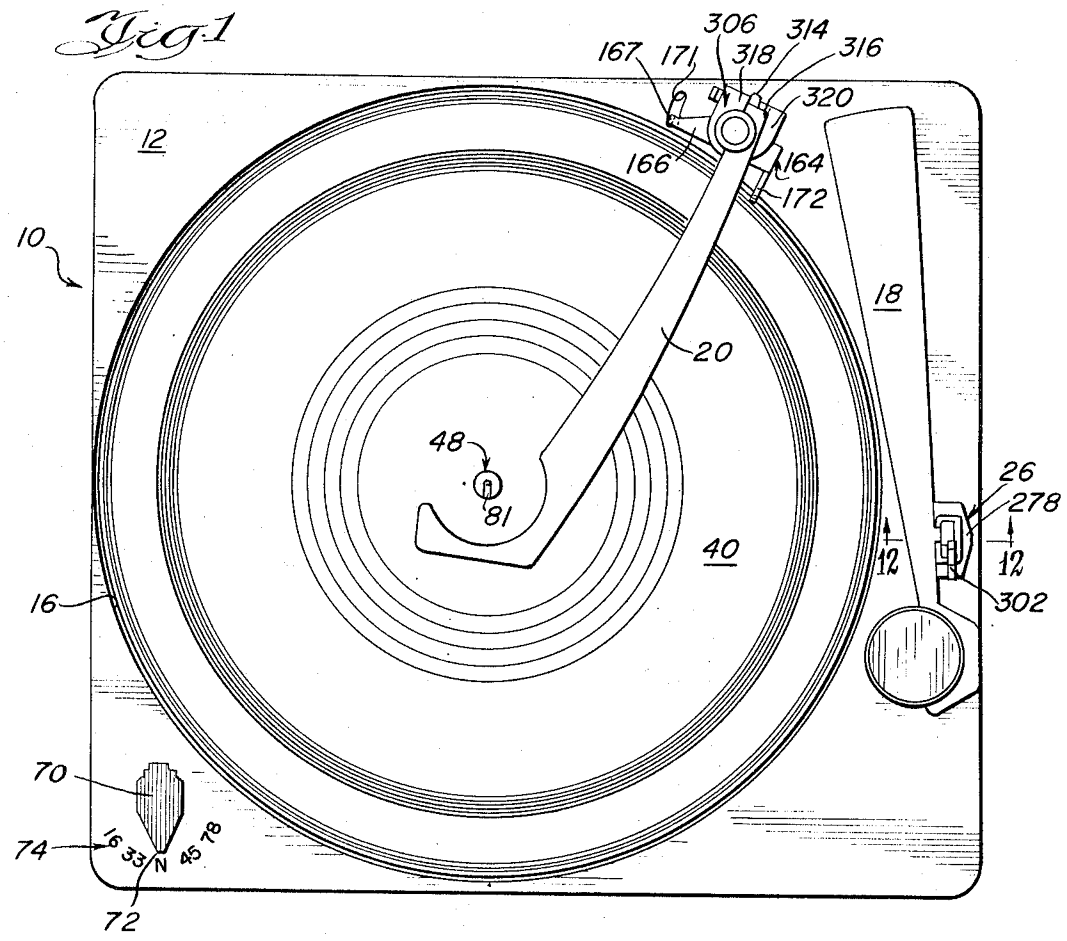
FIG. 1 is a top plan view of the phonograph apparatus embodying the invention, same being illustrated in its deenergized condition.

The phonographic apparatus of the character with which the invention is concerned includes, in addition to those elements shown in detail in the drawings, a cartridge or pick-up device, including a stylus adapted to track in the grooves of a record during the play thereof to produce electrical signals; an electronic amplifier for amplifying the siganls produced by the cartridge and transmitting same to an output device; and, an output device or speaker for converting the electric energy from the amplifier to audible sound.

The invention is principally concerned with the record changing mechanisms of said phonographic apparatus and particularly, with a novel cycling means provided therewith. Such cycling means of the invention functions to cause the stylus arm vertically to be raised from a perch to a predetermined height sufficient to clear a stack of records which is mounted upon a conventional spindle assembly including a center post disposed at the center or rotational axis of the turntable and thereafter to cause the stylus arm to be driven and guided radially inward toward the periphery of a rotating turntable. Immediately prior to actuation of the stylus arm toward the turntable, the cycling means activates means associated with the said spindle assembly to cause a single record to drop from the stack of records to the rotating turntable. When the record drops to the rotating turntable and revolves therewith, the stylus arm then is driven and guided radially inward relative to the revolving record a predetermined distance to place the stylus directly over the lead-in groove of the record, generally comprising the outermost circumferential groove of the record. The cycling means then proceeds to lower the stylus arm to place or set-down the stylus upon the revolving record at the said lead-in groove. At this point in the cycle the stylus arm is freed or uncoupled from any direct mechanical linkage with the driving and guiding means and freely follows the grooves of the record as the same revolves. The driving and guiding means of said cycling means are energized again when the stylus arm has moved to carry its stylus radially inward to a predetermined point. This is accomplished by a tripping switch that can be activated automatically at the completion of play of a record, and manually activated by actuation of the actuating arm at the perch to its reject position. The method or procedure considered herein for automatically tripping the tripping switch is to place the switch at a predetermined location from the radial center of the turntable to permit the stylus to track in commonly encountered lead-off or reject grooves provided on the record whereby to swing the stylus arm radially inward sufficiently to actuate the tripping switch.

Immediately thereafter, i.e., subsequent to the actuation of the tripping switch, the cycling means function to vertically lift the stylus arm and to return same in a radially outward movement relative to said revolving record to the perch position. This cycle is repeated automatically so long as there is a record remaining mounted upon the spindle assembly. Upon completion of play of the last-to-play record, the phonographic apparatus is returned to a deenergized condition and means are provided automatically to lock the stylus arm securely at the perch position. The phonographic apparatus further is provided with means for effecting continuous and automatic replay of the last-to-play record until the apparatus is manually deenergized.

The invention provides a cycling means for phonographic apparatus of the character described which is operated by a separate motor independent of the turntable motor instead of utilizing the motor commonly to drive the turntable and the cycling mechanism as normally done in prior devices. The cycling means of the invention includes driving and guiding means to determine and control the positioning of the stylus arm properly over the respective lead-in grooves of records adapted to be played seriatim and including a mixture of seven-ten-and/or twelve-inch records. The cycling means of the invention, considered generally, comprise a main cam-gear driven by said separate motor independent of the turntable motor; a drive lever positioned horizontally above the main cam-gear and adapted to be moved in both vertical and radial paths in a predetermined sequence; indexing means for determining the vertical displacement of the drive lever, including feeler means for sensing the diameter of the record being dropped upon the turntable and bracket means responsive to said feeler means; and, guide means adapted to be actuated by said drive lever and operatively coupled to the stylus arm to place the stylus arm in proper position for set down of the stylus at a location proper for the play of a seven-ten- or twelve-inch record. Said guide means includes a bracket member adapted to be engaged by the drive lever, a spring mounted cam-follower adapted to track upon the main cam-gear cooperatively for guiding the stylus end of the stylus arm to the proper set-down position, and lift means coupled to the stylus arm and cooperating with the cam formation to lift the stylus arm in a vertical direction upon actuation of said main cam-gear. The indexing means of the invention also includes means for determining the drop of the last-to-drop record whereby to cock said indexing means in a ready condition for deenergizing of the apparatus upon completion of play of said last-to-drop record and return of the stylus arm to a perch position. Removable record hold-down means also is contemplated.

It is contemplated that the feeler means associated with the indexing means of the invention is capable of distinguishing between a ten or a twelve-inch record. In view of the fact that seven-inch records conventionally are intended for play at a speed of 45 r.p.m., the speed-selector of the phonographic apparatus is utilized to actuate a lever through suitable linkages to control said indexing means for the play of seven-inch records. The feeler means of the invention also is provided with means to permit replay of the last-to-drop record with proper placement of the stylus regardless of the diameter of said record.

Referring now to the drawing, in FIG. 1, the record playing portion of the phonographic apparatus is illustrated, same being referred to hereinafter as the "player apparatus," and generally designated by reference character 10. The player apparatus 10 includes a pan 12 formed of generally rectangular configuration from sheet metal or the like material, said pan 12 including a peripheral, depending flange 14 and a shallow, annnular depression 16. The various mechanisms of the player apparatus 10 are mounted on the pan, either on the bottom or top surfaces.

In the figures, there are illustrated the following elements which are secured to the top of the pan 12: the stylus arm 18; the record support or hold-down arm 20; mounting posts 22 and 24 for the stylus arm 18 and hold-down arm 20 respectively; perch means 26, including locking means designated generally by reference character 28 and including return bent formation 30 mounted on the stylus arm and hook formation 32 mounted on actuating lever 34. The locking means 28 which will henceforth be referred to as a "grabber" means 300 is the invention of applicant and another and will be described in greater detail in a co-pending application filed.

A rim-drive turntable 40 is provided with a centrally mounted, depending bushing 38 and is adapted to be mounted for rotation through a central opening 36 formed in the depression 16 of pan 12 and being of sufficient diameter to clear said bushing. The bushing 38 has a central bore 42 of diameter sufficient to receive a vertically disposed center post 46 of the spindle assembly 48 which extends through aligned openings 36 and 42 to seat in a mounting bracket 49. The mounting bracket 49 is disposed below the pan 12 and is secured to the bottom thereof. A bearing assembly (not shown) is seated at the base of said center post 46 and functions as bearing means for the turntable. The configuration of the turntable 40 comprises a circular plate upon which a friction type mat (not shown) may be adhesively or otherwise secured, and a depending peripheral rim 50.

The shallow depression 16 of the pan 12 is also provided with a suitable opening 52 adapted to accommodate turntable drive means, shown generally at 54. The turntable actuating means 54 is mounted upon a plate 56 in turn secured to the undersurface of the pan 12 by means of brackets 58 and screws 60, said plate being parallel to and disposed below the level of the pan 12. The turntable drive means 54 generally is conventional and includes, in addition to motor 62, a stepped diameter drive shaft, an idler wheel, and camming means operative to raise and lower the idler wheel to produce predetermined rotational speeds of the turntable 40. Such speeds may be at the rate of sixteen, thirty-three, forty-five or seventy-eight r.p.m. The said camming means is actuated by means of a linkage 64, one end of which is secured to a lever 66 (FIG. 3) of the camming means, and the other end of which is secured to a pivotally mounted speed selector lever 68. Lever 68 includes a lug (not shown) adapted to pass through a suitable opening in the pan for engagement in a speed selector button 70 mounted to extend above the pan 12 and including an indicator or pointer 72. The various positions of lever 68 are indicated by indicia 74 stamped or otherwise inscribed upon the surface of pan 12 closely adjacent the button 70. The camming means may be provided with a fifth or neutral position, namely one where the idler wheel is disengaged with the drive shaft of motor 62.

Figure 4:
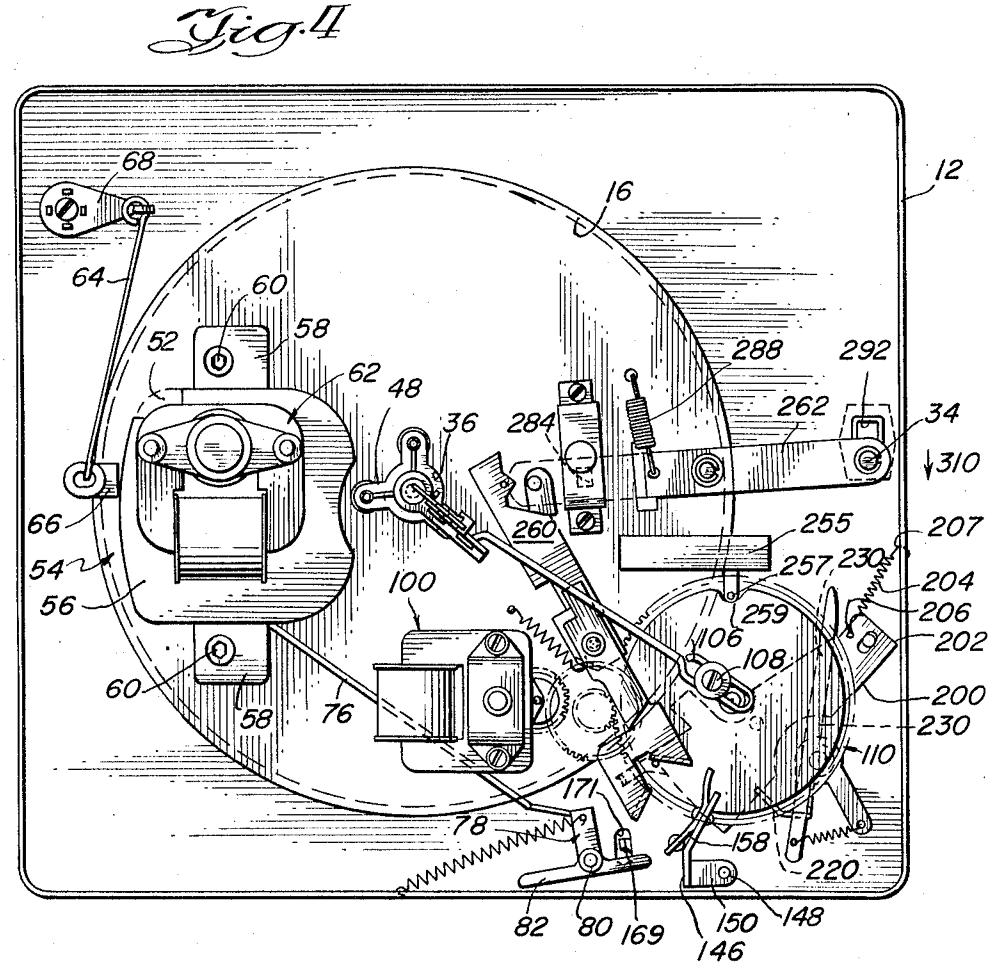
FIG. 4 is a bottom plan view of the apparatus shown in FIG. 1.
Figure 9:
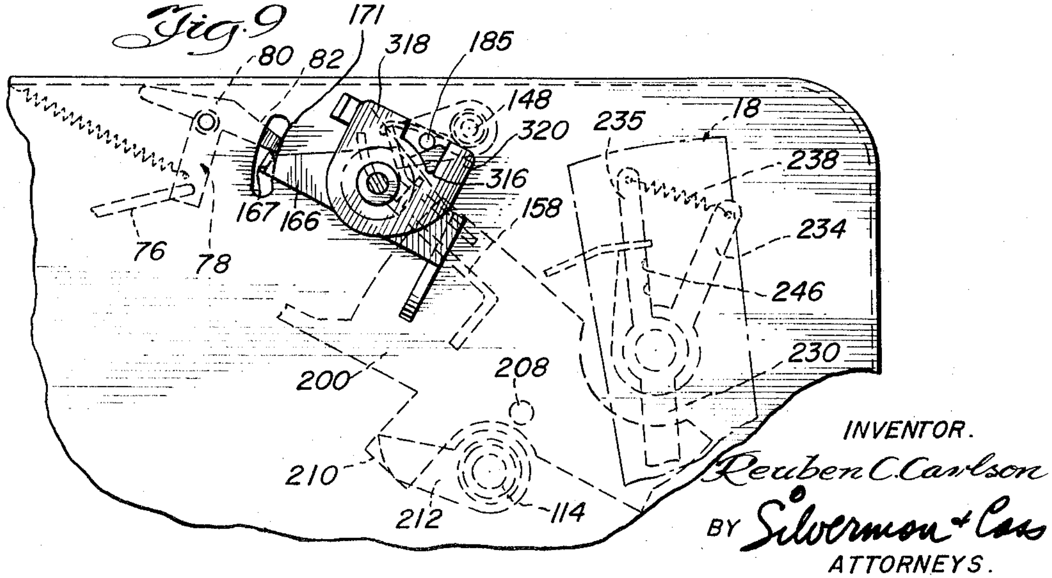
FIG. 9 is a fragmentary top plan view of the apparatus illustrated in FIG. 1 with portions of the cycling means shown in phantom outline and the novel record sensing means and said cycling means being shown in the condition assumed for the play of a 10 inch record.

A second camming means (not shown) is provided for operation in conjunction with the first mentioned camming means, same being also mounted upon the plate 56. The second camming means is biased to pivot between two possible conditions. The first condition occurs when the pointer 72 is directed toward the indicia indicating 45 r.p.m. and the second condition occurs when the pointer 72 is directed to other than the 45 r.p.m. position. A T-shaped or bell crank lever 80 is mounted to the undersurface of pan 12 adjacent the rim 14. A linkage 76 is connected between the second camming means and one arm 78 of the crank lever 80. The bell crank lever 80 is adapted to pivot between two positions, dependant upon the condition of the second camming means, and, thus, dependant upon the position of the button 70 and pointer 72. The purpose of these two positions of bell crank lever 80 will be explained hereinafter. The bell crank lever 80, as illustrated in FIG. 4 is shown in the first position assumed when the pointer 72 is in other than the 45 r.p.m. position.

As described above, the rim-driven turntable 40 and the drive means therefor are conventional. Likewise, the spindle assembly 48 also is of generally conventional construction. In addition to the center post 46, which is normally hollow, the spindle assembly 48 includes an upstanding rod 48 extending parallel to the upper end of the center post 46 but off-set therefrom to define a ledge 86. The rod 84 has a reduced diameter portion adjacent the ledge 86 as indicated at 85. The maximum diameter of both the center post 46 and the off-set rod 84 is chosen to enable same to pass through the generally standardized center hole of a record. The length of the rod 84 depends upon the thickness of the stack of records intended to be played and usually is designed easily to accommodate a one-inch thick stack. A lateral slot 81 is provided in the rod 84 along the length thereof bridged by a pin 87 and a slotted lever 88 is mounted thereon for reciprocable movement within the slot 81. The lever 88 terminates adjacent the ledge 86.

Figure 3:
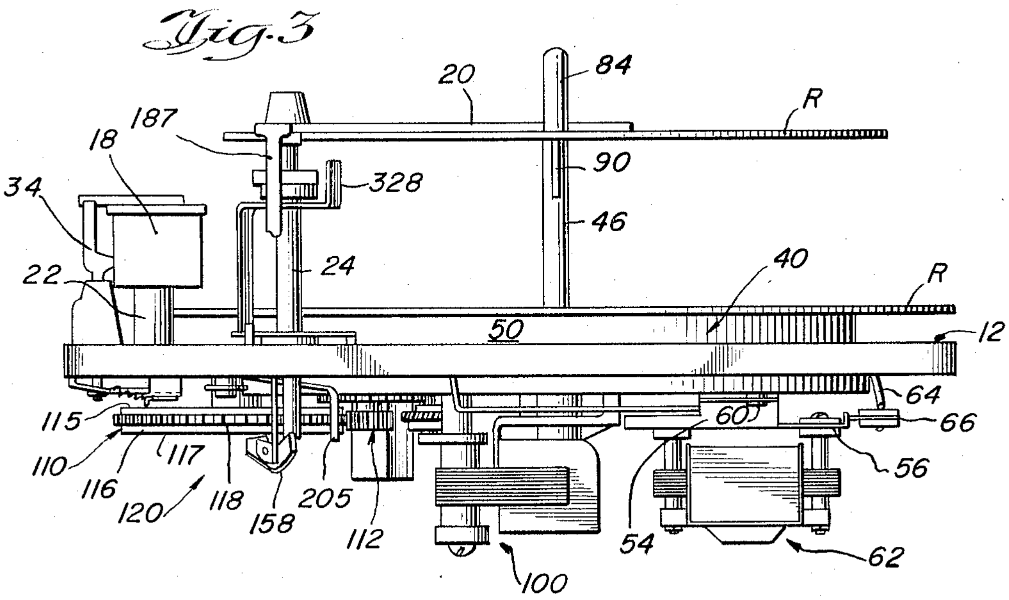
FIG. 3 is a rear elevational view of the apparatus shown in FIG. 1.
Figure 8:
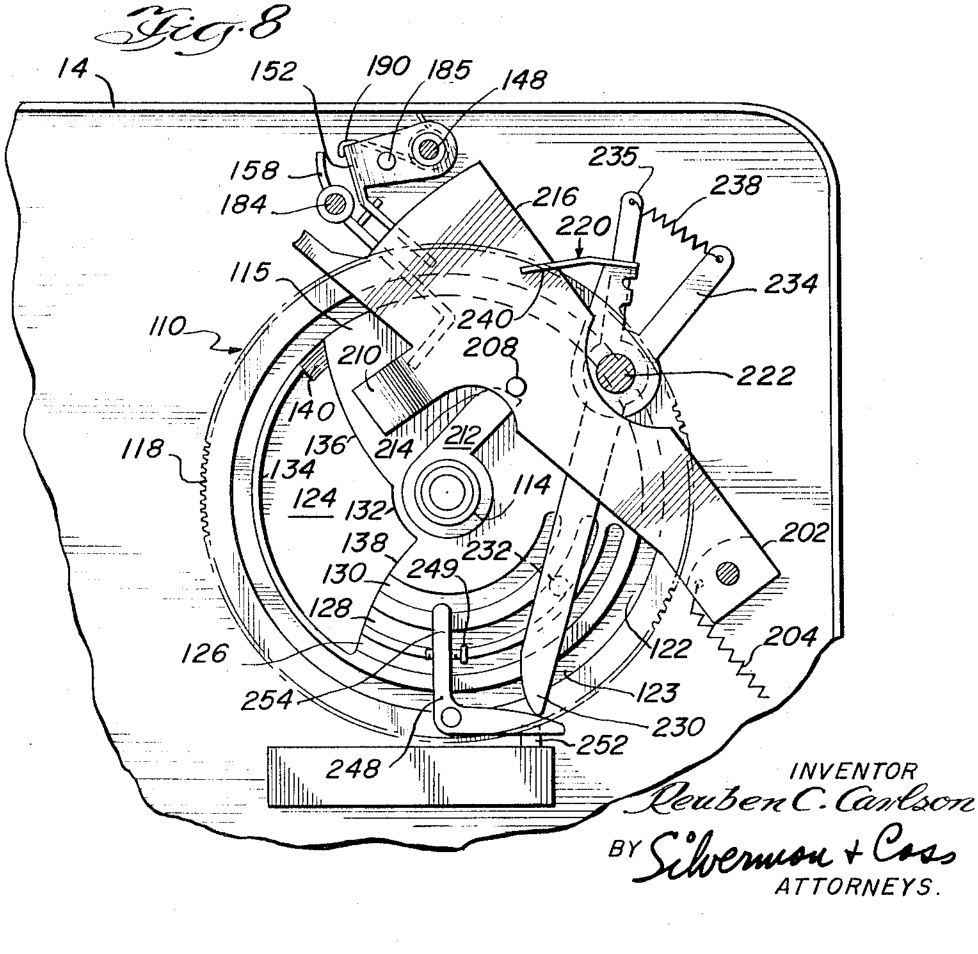
FIG. 8 is a fragmentary detail view similar to that of FIG. 5 taken through the top of the apparatus to illustrate the said elements in a condition assumed immediately prior to set down of the stylus upon the proper lead-in groove of a record.

The center post 46 includes an ejector lever 90 of conventional construction and a flat, spring-biased cam lever (not shown), said cam lever being actuated by a push-off pin 92 extending from the lower end of the center post 46. The ejector lever 90 is mounted for limited rotation in a slot (not shown) provided in the center post 46 opening adjacent the ledge 86 and has a normal inactive position disposed outwardly off-set from the center post 46 as shown in FIG. 3.

When the pin 92 is urged against the bias of its spring 94, the ejector lever 90 enters the center opening of the lowermost one of the stack of records supported on ledge 86 and pushes said one record off the ledge 86, thereby dropping the record to the then rotating turntable surface. The pin 92 is actuated by the action of torsion spring arm 96 which, in turn, is mounted on an L-shaped push-off lever 98 pivotally mounted at 99 to the mounting bracket 49 of the spindle assembly. The push-off link 104 is secured to the free arm 102 of the push-off lever 98; the opposite end of link 104 terminating in an elongate slot 106 adapted to receive a crank pin 108 therein. The crank pin 108 is mounted to the undersurface 117 of main cam-gear 110 for rotation therewith. The movement of the crank pin 108 with rotation of the main cam-gear 110 causes an eccentric movement of the link 104 to pivot the lever 98 thereby urging the pin 92 against its normal bias and thus to drop a record, such as R, from the ledge 86 to the revolving turntable. The aforesaid spindle action will occur once during each revolution of the main cam-gear 110.

Reference is now made to the cycling means of the invention which shall be designated generally by reference character 120. The cycling means 120 includes the main cam-gear 110 coupled through gear train 112 to a motor 100, the operation of which is independent of the turntable motor 62. The main cam-gear 110 comprises a relatively flat, cylindrical disc preferably formed of plastic, having a central hub 114 and a circumferential wall 116. The main cam-gear 110 is mounted for rotation upon suitable bearings (not shown) secured to the undersurface of the pan 12. Gear teeth 118 are provided integral with the circumferential wall 116 and are adapted to engage the gear train 112. One surface of the main cam-gear 110 hereinafter will be referred to as the cam surface 115 and the other surface of the main cam-gear 110 shall be designated as the undersurface 117 thereof. Formed in the cam surface 115 are an outer peripheral groove 112, a shallow depression 124 spaced inwardly of the groove 122 and a series of tracks or grooves 126, 128 and 130 concentrically arranged radially spaced from the hub 114. The radial distance for each of said track portions is chosen whereby to guide the stylus arm 18 to the proper set down position depending upon the diameter of the record and the hereinafter defined relationships of the indexing means and the drive lever of the cycling means.

The shallow depression 124 which is provided in the cam surface 115 is defined by inner and outer arcuate walls 132 and 134 and a pair of arcuate side walls 136 and 138 of unequal length. The inner arcuate wall 132 is spaced slightly from the hub 114 and is substantially smaller in length than outer wall 134. The tracks or grooves 126, 128 and 130 preferably are of V-shaped cross-section and start at a location spaced angularly from the arcuate side wall 136, extend partially around the hub 114 to terminate through the arcuate side wall 138. A ramp 140 is formed between the outer wall 134 and the side wall 136 whereby to communicate between the depression 124 and the outer groove 122. The outer groove 122 is provided with a depression 123 in the floor thereof, for receiving a lift pin 224 to be described hereinafter. The location of said depression 123 along the length of the groove 124 is chosen so that when the stylus arm has been guided in its radially inward movement for placing of the stylus upon the proper lead-in groove of the record, the lift-pin 224 rests in said depression 123, thereby lowering the stylus at the proper place upon the record. The V-shaped cross-sectional configuration of grooves 126, 128 and 130 is preferred since variations in the actual descent of the stylus will be compensated for by the centering action of the walls of grooves 126, 128 and 130 when the cam-follower 232 enters upon any portion of one of said grooves. In some instances, it may be desirable to broaden the V at the beginning of each groove and gradually converge same as each groove approaches wall 138. Thus, only the configuration and position of the grooves determine the precise set down position of the stylus, hence rendering the said position independent of wear or closely maintained tolerances on the majority of the other parts of the cycling means.

The undersurface of the main cam-gear 110 is planar and carries, mounted thereto and depending therefrom, and in addition to pin crank lever 108, a stop pin 142 spaced radially outward of the central axis of said main cam-gear 110. Stop pin 142 functions first, immediately subsequent to the dropping of the last-to-play record upon the turntable, and, second, subsequent to the completion of play of said last-to-play record, the latter function being to trip a lever to deenergize both motor 62 and motor 100.

The indexing means of the invention is designated generally by reference character 144 and includes an indexing bracket 146 which is pivotally mounted to the bottom surface of the pan 12 at bushing 148 between flange 14 and the periphery of main cam-gear 110. Bracket 146 includes a tongue 150 having a depending portion 152 which carries a stepped edge portion 154 and a mounting portion 156, the mounting portion having a pivotally mounted stop lever 158. The lever 158 is mounted on portion 156 for pivotal movement in a direction normal to the pan 12 but is carried for swingable movement with the bracket 146. The lever 158 carries a notched portion 160 and a blade portion 162, the purpose of which will be described hereinafter.

The feeler means of the invention is generally designated by reference character 145 and comprises a lever 164 of substantially U-shaped configuration having a base 166, an upright portion 168 and a return arm 170. The portion 168 is provided with a V-shaped bend 172 extending outward from one edge of portion 168 at a location closely adjacent bend 176, which joins the portion 168 to the return arm 170. The base 166 and return arm 170 have aligned passageways 182 to permit passage of the hold-down mounting post 24 therethrough, said lever being rotatable about said post 24. The mounting post 24 is hollow whereby telescopically to receive a support rod 184 secured to and depending from the hold-down arm 20 at a location spaced from the depending arm 187 at one end of said arm 20. The base 166 carries a lug 167 depending therefrom and secured thereto at that free end spaced from bend 169. The flange or lug 167 rides in arcuate slot 171 formed in the pan 12. The cross arm 82 of the crank 80 extends across the slot 171 at one end thereof to assume the first of the two conditions thereof described earlier in this specification. The flange 167 and slot 171 cooperate to limit the rotational movement of the indexing bracket 146. In the said first condition the arm 82 blocks the slot while arm 82 is disposed clear of the slot 171 when the crank 80 is in the second condition.

Referring now to the bracket 146, the tongue portion 150 thereof has an upstanding lug 185 disposed between the pivot at 148 and the depending portion 152. An arcuate slot 188 is formed in the pan 12 and the lug 185 is engaged in the slot to be guided for movement therein.

The bracket 146 is biased by torsion spring 190 to move in a counter clockwise direction, viewed through the top of the pan 12. The bracket 146 thus normally would rotate so that the stepped portion 154 is urged toward the main cam-gear 110. The rotational movement of bracket 146 is limited by the available length of the slot 188 as well as by the length of the slot 171 available for movement of lug 167 therein.

The stepped edge portion 154 has four steps described in order of ascent as steps 192, 194, 196 and 198, the last mentioned step 198 comprising the upper edge of the stepped portion 154. The operational relationship between the bracket 146 and the other elements of the cycling means of the invention will be described hereinafter.

Referring now to the actuating lever 200, same is fulcrumed at the bracket end 202 thereof and secured thereat to the pan 12, the opposite end of said lever 200 being free. The lever 200 is disposed across and above the main cam-gear 110 between it and the pan 12 and is capable of angular swingable movement relative the cam surface 115. Said lever 200 further is biased by spring 204 to a normal condition where the said opposite end rests closest to the cam surface 115. The lever 200 is capable of pivotal movement in a vertically oriented path relative said cam surface 115 and against the bias the said spring 204. Spring 204 is secured to bracket 206 at end 202, while the opposite end thereof is secured to the rim 14 of pan 12, as shown at 207 biasing the lever 200 inward toward the hub 114. The driving lever 200 carries a depending pin 208 at one edge 203 thereof, said edge 203 being disposed closely adjacent the hub 114 of main cam-gear 110 in the normal position of said lever 200. The edge 203 is arcuate, being centered and partially extending about the hub 114. Immediately adjacent said edge 203 of the lever 200, there is provided a depending arcuate lift blade 210. A radially outwardly extending blade 212 is mounted on the hub 114 to be disposed immediately below the lever 200 and is rotatable with the main cam-gear 110. The lift blade 210 cooperates with the radially outwardly disposed blade 212 to raise the lever 200 vertically as the main cam-gear 110 rotates. The height of said blade 212 above the cam surface 115 is such to permit the lever 200 to be raised above the level of the uppermost step 198 of bracket 146. Further rotation of the main cam-gear 110 causes the lift blade 210 to be dropped from the blade 212 to return to its normally biased condition except for the interposition, at that instant, of one step of the bracket 146 in its vertical path of descent so that the lever 200 falls upon the said one step. Exactly which step of the four available steps is presented to the lever 200 is determined by the extent of rotation permitted by the feeler means. The blade 212 is provided with one cam edge 214 so disposed that further rotation of the main cam-gear 110 will urge the said cam edge 214 to bear against the pin 208 carried by driving lever 200 and, with continued rotation of the main cam-gear 110, the drive lever 200 will be swung angularly outward from the axis of the main cam gear 110 at a level determined by the said one step upon which the driving lever 200 rests. Thus, the driving lever 200 is driven against one of the bottom opening notches 218 of guide bracket 220. The biasing spring 204 is so positioned that the pin 208 is continually biased toward the blade 212.

The guide bracket 220 is mounted at the lower end of stylus arm support shaft 222, the said shaft 222 being telescopically engaged and rotatable within the hollow cylindrical stylus arm support post 22. The said shaft 222 is also hollow and contains a spring biased lift pin 224 vertically movable therein selectively to lift the stylus arm 18 in a vertically oriented path of movement.

The stylus arm 18 is generally conventional in configuration and is mounted upon a saddle member 228 which includes adjustment means 226 controlling the pressure exerted by the stylus upon the record. The lift pin 224 terminates at its upper end at a point of securement to the saddle member 228 whereby actuation of the pin 224 will lift the stylus arm. The stylus arm is also capable of swinging movement radially relative the turntable 40 upon rotation of the shaft 222. The angular displacement of the stylus arm 18 is guided by a flat spring arm 230 having a cam follower button 232 mounted thereto spaced from one end 233 thereof and mounted at its opposite end to the shaft 222 for swinging movement with rotation of guide bracket 220 responsive to the driving action of driving lever 200.

The guide bracket 220 includes, in addition to the notched edges 218, an arm 234 integral therewith and extending from the pivot connection 236 obliquely relative and extension 235 provided integral with the said opposite end of spring arm 230. The extension 235 and the said opposite end are coupled by means of spring 238. The notched edges 218 of the guide bracket 220 are formed on the vertically disposed portion 240 of guide bracket 220. Said vertically disposed portion 240 is formed integrally with a flat portion 242 of guide bracket 220 and disposed normal to said portion 242. Flat portion 242 carries the pivot connection and terminates in the arm 234. A depending lug 246 formed on one edge of the flat portion 242 secures the spring arm 230 spaced from the arm 234 so that the spring 238 is under tension. The relationship last described functions to absorb and contain any shock exerted upon the stylus arm 18, such as by irregular or erratic movement thereof even during the rotation of the main cam-gear 110 of the cycling means whereby jamming or damage of the cycling means 120 is avoided.

The cycling means 120 further includes means for energizing and deenergizing the motor 100 at appropriate times. An L-shaped tripping switch lever 248 is mounted pivotally as at 250 to the undersurface of the pan 12 at the point of convergence of its arms and disposed normally with one arm 254 in the path taken by the spring arm 230 during the playing phase of the apparatus 10. The arm 254 carries a conventional adjustment screw 249. When the playing of the record is completed, the spring arm 230 strikes the arm 254 of lever 248 to pivot same thereby releasing normally closed switch 252, and energizing motor 100. Thus the main cam-gear 110 is actuated and begins to rotate.

A second normally open switch 255 is coupled to the tripping switch 252 and is provided with a spring biased contact lever 257 receivable in a notch 259 formed in the circumferential wall 116 of the main cam-gear 110. When switch 252 is released and the main cam-gear 110 immediately begins to rotate, lever contact 257 is forced out of the notch 259 and closes switch 255 to maintain rotation of the cam for a full revolution at which time the said notch 259 is aligned with the lever contact 257. The switch 255 is then once again opened, deenergizing the motor 100.

The cycling means 120 of the invention also includes stop lever means comprising a bracket 256 disposed somewhat parallel to the pan 12 and the surface 117 of main cam-gear 110. Said bracket member 256 has a flat portion 258, one end of which pivots on a common pivot axis with a first lever element 260 which in turn is engaged with a second lever element 262 operatively connected to the actuating lever 34 of the player apparatus 10. The bracket member 256 further comprises a second flat portion 264 connected by web 266 to the first portion 258. The first portion 258 is disposed in a horizontal plane parallel to but spaced from the plane occupied by portion 264. Portion 264 of bracket 256 has a lug 268 provided along one edge thereof extending normal relative thereto. Lug 268 is angularly positioned relative to web 266 whereby the pin 142, striking lug 268, pivots the bracket 256 radially inward toward hub 114, and the pin 142 striking web 266 pivots the bracket 256 outward relative said hub 114. Portion 264 has an arm 270 extending co-planar therewith spaced from lug 268. Said arm 270 has a lug 272 also normal thereto and integral therewith. The bracket 256 extends below the main cam-gear 110 near the undersurface 117 thereof. In the deenergized condition of the apparatus 10, the lug 268 is disposed directly in the path of stop pin 142. Upon actuation of the cycling means and rotation of the main cam-gear 110, the inner surface 274 of web 266 is selectively placed in the path of the stop pin 142 subsequent to movement of the lug 268 out of the said path by pin 142. The relationship of the bracket 256 to the apparatus 10 will be evident in connection with a description of the actuating means of the invention and the operation thereof which follows.

The actuating means for the player apparatus 10 according to the invention includes an actuating lever 34 mounted for limited rotational movement in a vertically oriented path relative the pan 12 on a shaft 276 mounted in housing 278. Said actuating lever 34 has an actuating arm portion 280 extending above the pan 12 and a portion 282 disposed extending below the pan 12. A suitable slot 292 is provided in the pan 12 to permit the lever 34 to extend therethrough as described. The portion 282 is secured pivotally to the second lever element 262 whereby movement of the lever portion 280 fully in the direction of arrow 310 in FIG. 4 will actuate switch means 284 to energize both the turntable motor 62 and the cycling means motor 100. With the motor 100 energized, the main cam-gear 110 will be rotated, causing the pin 142 to move from the position shown in FIG. 5 to that shown in FIG. 6. Here, the bracket 256 is formed momentarily toward hub 114 countering the bias of spring 286. The main cam-gear 110 continues to rotate, with the pin 142 releasing lug 268 and permitting spring 286 to return the bracket 256 whereby web face 274 is placed in the path of pin 142. Bracket 256 is provided with an end extension 269 and lever element 60 is provided with an upstanding lug 267. Extension 269 and lug 267 act as means to limit the relative movement of bracket 256 and lever element 260, particularly when said last mentioned members are in position assumed at the deenergized condition of the apparatus 10.

With the end face 274 in the path of pin 142, upon continued rotation of the main cam-gear 110, the pin 142 bears against said face 274 to take up some of the tension exerted by spring 286 causing the bracket 256 to pivot relative to lever element 260 whereby the full tension of the spring 286 is exercised upon the said lever element 260 to lock the switch 284 engaged in an energized condition for the motor 62. The switch 284 will then be opened so far as the cycling means motor 100 is concerned but, since the motor 100 will now continue to operate as a result of the closing of switch 255, the control for energizing the cycling means will remain with the switches 252 and 255. This condition will continue so long as the bracket 256 and lever 260 remain in the condition shown, for example, in FIG. 7.

The lever 262 is biased by helical spring 288 to return to the deenergized condition immediately upon release of levers 260 and 262 from their locked-in condition. At such time, both motors 62 and 100 are deenergized. The release of said levers 260 and 262 also causes the recovery of the actuating lever 34 to lock the stylus arm 18 to the perch by locking means 28.

Figure 12:
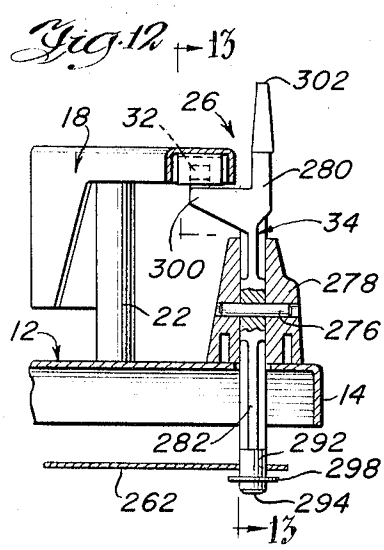
FIG. 12 is a sectional view taken along line 12—12 of FIG. 1 and in the direction indicated.
Figure 13:
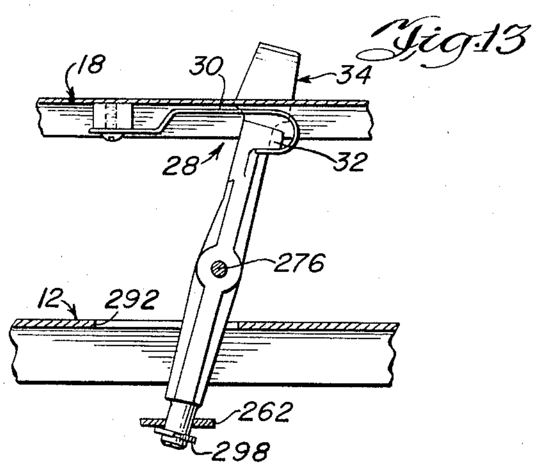
FIG. 13 is a sectional view taken along line 13—13 of FIG. 12 and in the direction indicated.
Figure 2:
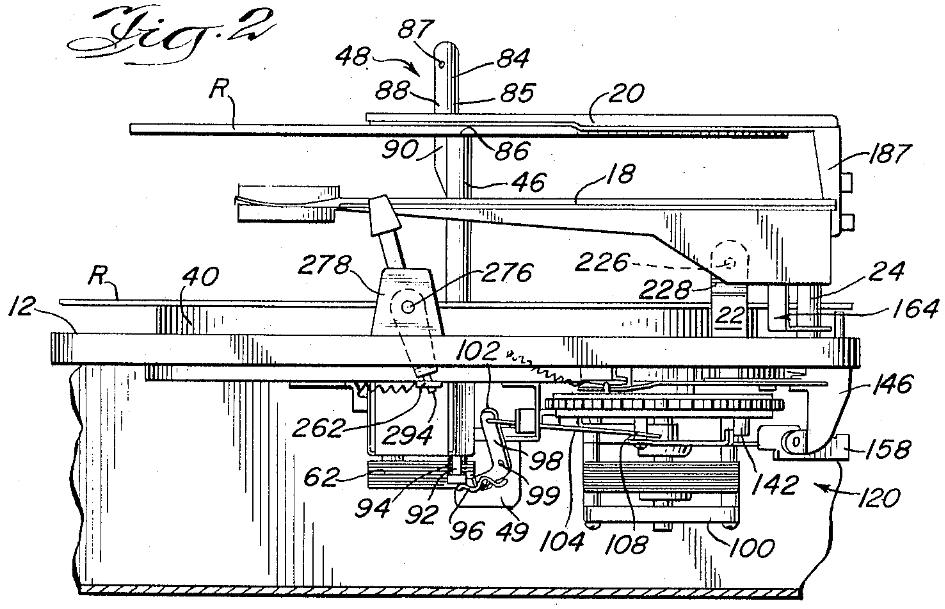
FIG. 2 is a fragmentary side elevational view of the apparatus shown in FIG. 1.
Figures 10, 11:
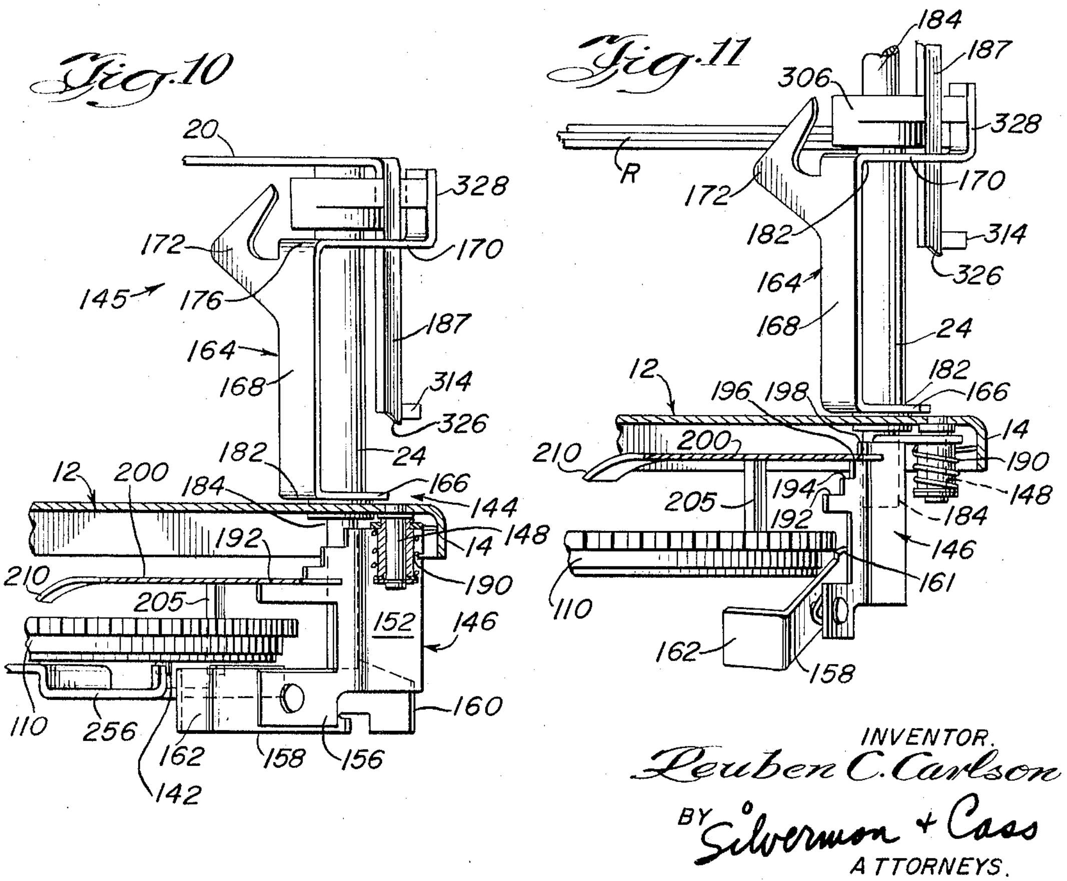
FIG. 10 is a sectional view taken along line 10—10 of FIG. 5 and in the direction indicated.
FIG. 11 is a view similar to that of FIG. 10 illustrating the apparatus with records on the spindle in a ready-to-play condition.

Directing attention now to FIGS. 12 and 13, the actuating lever 34 is shown pivoted on a shaft 276. The shaft 276 is mounted in housing 278, said housing being secured to the pan 12 closely adjacent flange 14 thereof. As stated hereinabove, the actuating lever 34 has a portion 280 extending above the level of the pan 12 and portion 282 extending below the level of the pan, the lever 34 passing through slot 292 formed in the pan. The portion 282 has its free end 294 passing through a suitable opening 296 formed in the lever 262 and locked therein by a suitable snap ring 298 or the like.

Figure 7:
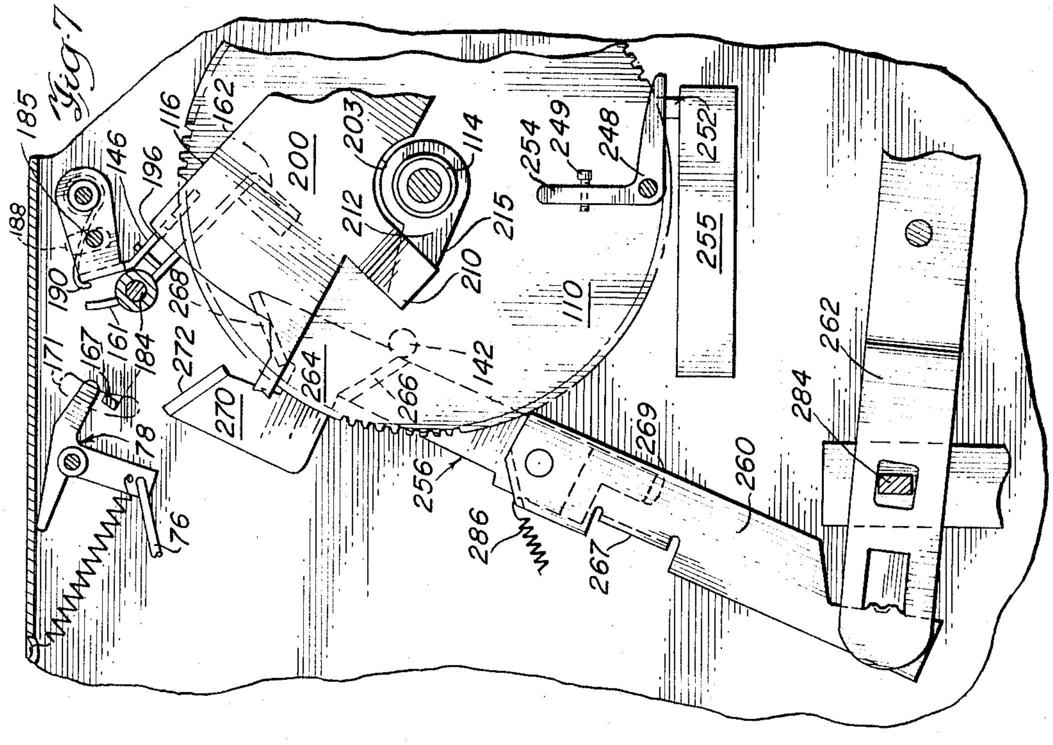
FIG. 7 is a view similar to that of FIG. 6 illustrating the said elements in an intermediate condition assumed immediately subsequent to the condition shown in FIG. 6.

The upper portion 280 of lever 34 has a grabber formation 300 secured thereto at a location spaced from the free end 302 of portion 280. The grabber formation 300 includes hook formation 32 integral therewith cooperating with a return-bent bracket 30 mounted within the stylus arm 18. When engaged, the hook formation and bracket, 32 and 30 respectively, cooperate to lock the stylus arm 18 on the perch. The bracket 30 may comprise a return-bent spring to permit bodily forcing of the stylus arm from its locked position without breaking of its parts. This is a safeguard against damage due to rough handling. The actuating lever 34 is pivotal through three positions, one of which represents the OFF or deenergized condition of the player apparatus 10; the second position represents the PLAY condition of the player apparatus 10 and provides for continuous automatic play of the stack of records; and the third position represents the REJECT condition and provides for the initial energization of both motor 62 and the cycling means by energization of motor 100. Movement of the lever 34 to the REJECT position will override any other control mechanisms and energize the motor 100 to initiate operation of the cycling means 120. The levers 260 and 262 are locked in as illustrated in FIG. 7, during assumption of only the PLAY position the actuating lever 34 returning to the PLAY position immediately upon the locking-in of said levers 260 and 262. The lever 34 will be returned to the OFF position only upon release of lever 260 from engagement with lever 262, and only after the last-to-play record has been dropped from the spindle and play thereof has been completed. This, of course, assumes that the operation is maintained fully automatic with no provision for replay of the last-to-drop record, a situation which will be examined hereinafter. The lever 34 may be manually returned to the OFF position by the operator if he so chooses.

Now that most of the important elements of the playing apparatus 10 have been cataloged and described, attention may be directed toward illustration of typical operations of the playing apparatus under the several different conditions encountered.

Figures 5, 17:
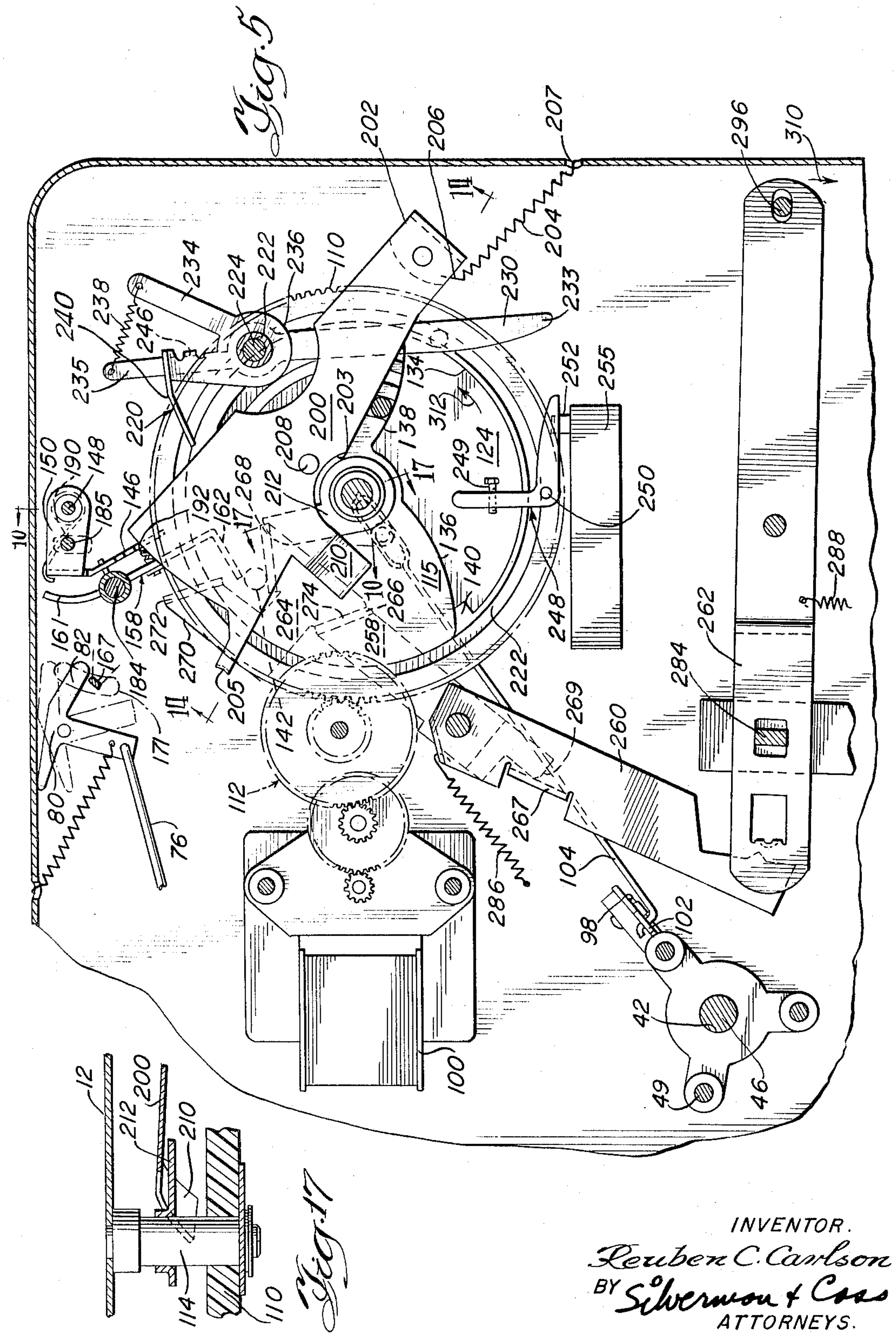
FIG. 5 is a fragmentary plan view taken through the top of the apparatus shown in FIG. 1 with the turntable and top plate removed for clarity.
FIG. 17 is a sectional view taken along line 17—17 of FIG. 5 and in the direction indicated.
Figure 6:
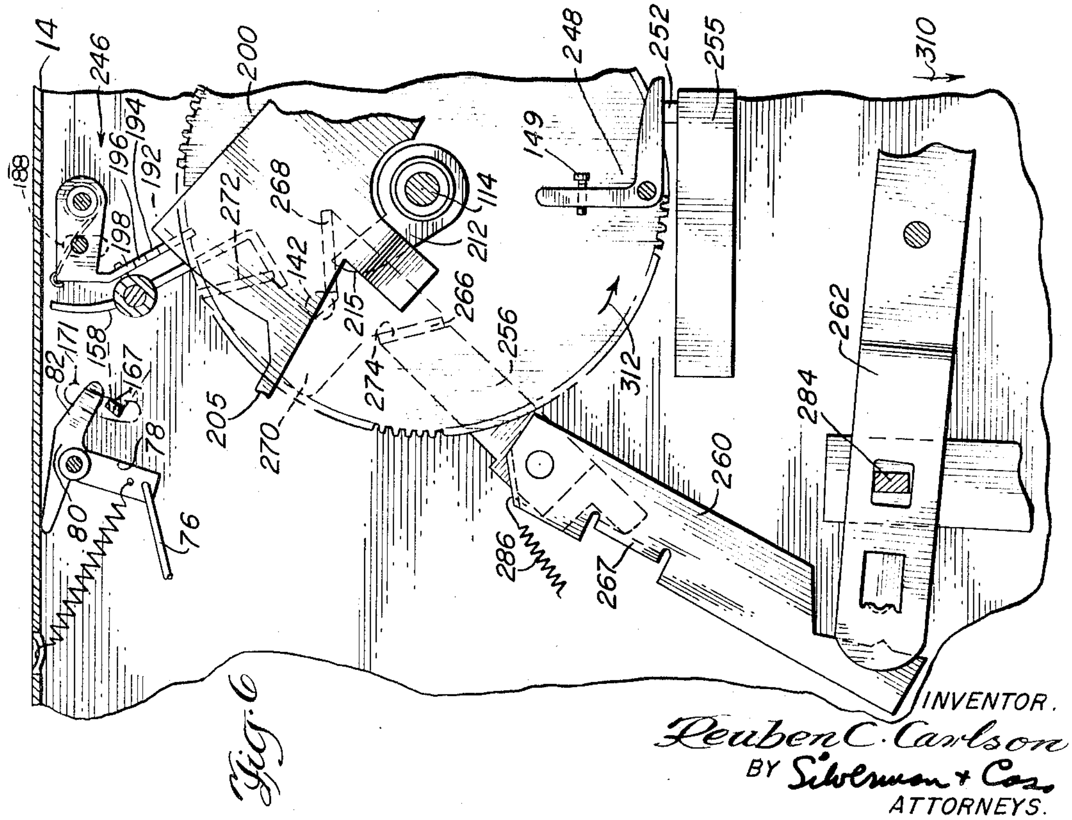
FIG. 6 is a fragmentary detail view of the apparatus shown in FIG. 5 illustrating the position of the elements thereof in the condition assumed immediately subsequent to energization of the cycling means of the invention.
Figure 14:
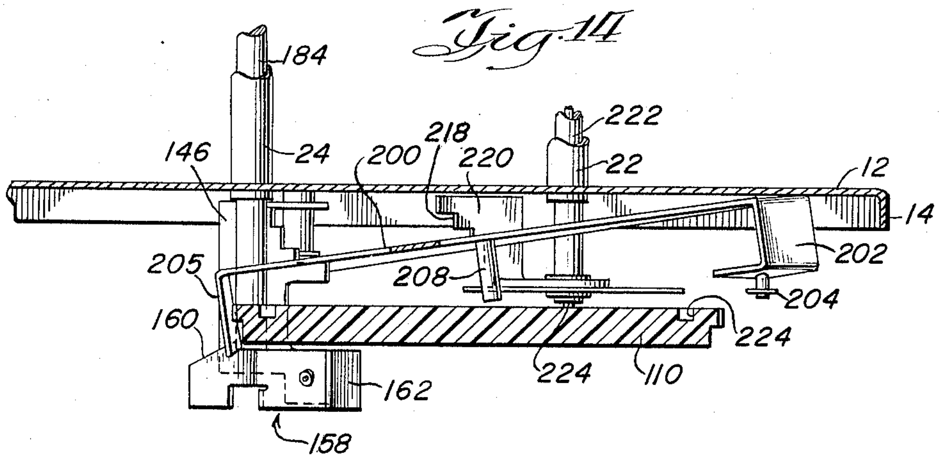
FIG. 14 is an enlarged sectional view taken along line 14—14 of FIG. 5 and in the direction indicated.

In FIG. 5, the playing apparatus 10 is illustrated in a deenergized condition. The speed selector button 70 has been positioned with the pointer 72 thereof directed toward the 33 r.p.m. indicia, and, hence, the bell crank lever 80 is illustrated in the condition assumed during the play of ten- or twelve-inch diameter records. The cross arm 82 of bell crank lever 80 is directed across the slot 171 so that the movement of the lug 167 over the full length of the slot 171 is restricted. Thus, the extent of rotational movement of the indexing bracket 146 is limited whereby the said indexing bracket 146 will be in a condition in which the drive lever 200 may descend only to the steps 194 or 196 only, representing the desired set down for twelve- or ten-inch records, respectively. The bracket 146 would then be normally in the condition where stop 196 is presented to the dropping drive lever 200. Now, if the feeler means 145 is not actuated by the drop of a twelve-inch record to the turntable, the bracket 146 will not be moved, hence the drive lever 200 will engage upon the step 196 and thereafter drive the guide bracket 220 to move the cam follower button 232, radially inward to the vicinity of groove 128 of the main cam-gear 110. This will in turn cause the stylus arm 18 to be positioned so that the stylus will be at the proper lead-in groove of a ten-inch record. It should be noted that the bracket 146 may be urged by pin 142 to a condition where the lowermost step 192 is presented to the dropping lever 200. In such case, which occurs only upon the completion of play of the last-to-play record, the guide bracket 220 is not moved by drive lever 200, the cam follower button 232 remains in groove 122, and in turn, the stylus arm 18 is lowered to rest on perch 26; the apparatus 10 then being deenergized.

Looking now to the condition where a twelve-inch record is dropped from the spindle assembly 48, and the speed control is set for other than 45 r.p.m., the base member 166 of the feeler means 145 is disposed so that the upstanding member 168 and its V-shaped portion 172 are closest to a position adjacent the turntable whereby a ten-inch record will not contact the portion 172 during its drop to the turntable. A twelve-inch record dropping to the turntable, however, will move the base 166 from its normal position urging the lug 185 in the slot 188, thereby rotating the indexing bracket 146 to present step 194 to the dropping drive lever 200.

Thus, the player apparatus 10 manually is set to rotate the turntable 40 at a speed other than 45 r.p.m., and thereby communicates this intelligence to the indexing means 144 and indexing bracket 146 by means of bell crank lever 80. The feeler means 145 then distinguishes between the drop of a ten- or a twelve-inch record, and communicates this intelligence to the indexing bracket 146 by means of base 166 determining the position of lug 185 within slot 188.

Referring once again to FIG. 5, the actuating linkages are shown with the lever 262 disengaged from lever 260, and with the bracket 256 interposed in the rotational path of pin 142 with said pin 142 resting against the lug 268. The horizontal lever 200 is illustrated disposed upon the step 192 representing the OFF condition of the apparatus. The button cam follower 232 of spring arm 230 rests within the outer groove 122 of main cam gear 110 and the lift pin 224 also is disposed in depression 123 of said outer groove 122.

Immediately upon actuation of lever 34 to the REJECT position by pivotal movement thereof in the direction represented by arrow 310 in FIG. 5, the switch 284 is actuated energizing both motor 62 for the turntable and motor 100 to actuate the cycling means 120 of the invention. When the motor 100 is energized, the main cam-gear 110, connected thereto by gear train 112, begins to rotate in the direction indicated by the arrow 312 in FIG. 5. Now the cycling means 120 assumes the condition shown in FIG. 6. The pin 142 urges lug 268 toward the center of the main cam-gear 110 and drives the bracket 256 to a condition where web 266 is disposed with the face 271 thereof positioned in the path of pin 142. Simultaneously the lift blade 212, which of course is mounted for rotational movement with the main cam-gear 110, engages lift blade 210 of the drive lever 200, thereby lifting same as the rotation of the main cam-gear continues. Also, simultaneously with the rotation of the main cam-gear 110, the lift pin 224 moves out of depression 123 of outer groove 122 thereafter to ride in said groove 122 to the completion of one revolution of the main cam-gear 110. The lifting of lift pin 224 causes the stylus arm to lift vertically from the perch 300 of perch means 26, which, of course, has released the stylus arm from its locked-in condition with the initial actuation of lever 34.

With the rotation of cam-gear 110, the link 104 is actuated to its eccentric movement by the pin 108 rotating with the main cam-gear 110 to move within slot 106 of said link 104. Thus the spindle assembly 48 is actuated for the drop of the next-to-play one of the records mounted upon spindle ledge 86. With the drop of the said next-to-play record, the shaft 184 depending from hold down arm 20 also moves downward toward the lever 158.

Lifting of the driving lever 200 by the blade 212 acting upon lift blade 210 will release the indexing bracket 146 and permit same to rotate to the extent permitted by the disposition of lug 167 in slot 171, which is controlled by the setting of the speed control lever 68. Thus, in FIG. 7, the indexing bracket 146 is illustrated in the condition where the step 196 representing the ten-inch record position is presented to the drive lever 200. As stated earlier, this condition is the normal condition where the speed control lever 68 is set to a turntable speed other than 45 r.p.m. Simultaneously with the lifting of the drive lever 200, the bracket 256 is swung out of the path of the pin 142 and levers 260 and 262 are placed in locked-in condition, as shown in FIG. 7. In this manner the turntable 40 is maintained in rotating condition. With the initial energization of motor 100, the main cam-gear 110 and rotation of the main cam-gear 110, the switch lever 257 is moved out of notch 259 closing the switch 255 to continue the energization of motor 100 and rotation of said main cam-gear 110. When a single revolution of the main cam-gear 110 has occurred, the lever 257 will fall into notch 259 and open switch 255, thereby deenergizing motor 100 and stopping main cam-gear 110. The turntable 40 will continue to rotate since the motor 62 is independent of the operation of motor 100.

Continued rotation of the main cam-gear 110 causes the blade 212 to leave lift blade 210 and lower the driving lever 200 vertically to place same upon the step 196 of indexing bracket 146. Further rotation of the main cam-gear 110 directs the cam-like edge 214 of blade 212 against pin 208 of said driving lever 200. The driving lever 200 is then driven angularly whereby the edge thereof bears against the guide bracket 220 at a level dependent on the level of step 196, in this instance at a notch 218 at said level. The said driving lever 200 will drive the guide bracket 220 to rotate same, thereby pivoting the stylus arm 18 angularly radially inward relative the turntable to the extent determined by the particular notch 218. With the pivotal movement of stylus arm 18, like pivotal movement of the spring arm 230 with its cam follower button 232 will occur. The cam follower button 232 is forced out of groove 122 and is moved radially inwardly of main cam-gear 110 over the cam surface 215 to be guided in the groove 128 representing the set down or placement position for the stylus proper for a ten-inch record. Thus the stylus is guided to its proper set down or placement upon the record for play thereof. With the cam follower button 232 following the proper groove or track 128, continued rotation of the main cam-gear 110 directs the button 232 to the edge of said track 128 at annular wall 138 and thence to drop to the depression 124 since, concurrently, the main cam-gear 110 will have completed one revolution and the lift pin 224 has descended into depression 123 of groove 122 lowering the stylus arm 18 to place the stylus upon the record surface. The switch lever 257 will drop into notch 259 and the motor 100 will be deenergized, stopping the rotation of the main cam-gear 110, hence completing one phase of the cycle.

Upon this occurrence, the stylus arm 18 is free of any interlinking or controlling connections with the cycling means, and the path taken by the spring arm 230 and cam follower button 232 is determined solely by the grooves of the record being tracked by the stylus. Movement of the spring arm 230 in response to the movement of the stylus tracking in the grooves of the record during the play thereof, will cause the cam follower button 232 to follow a path generally parallel to the arcuate wall 138 toward the hub 114.

At the end of play of the record, the stylus will arrive at the customarily provided lead-off grooves of the record and thus will cause the stylus arm to be swung radially toward the axial center of the record. The cam follower button 232 then is positioned near the juncture of the inner wall 132 and the arcuate side wall 138 while the spring arm 230 contacts the tripping switch lever 248, instantaneously closing tripping switch 252 to energize the motor 100 and initiate rotation of the main cam-gear 110.

As the main cam-gear 110 rotates, the switch lever 257 is released from the notch 259 of the main cam gear 110 so that when the tripping switch lever 248 recovers, to open switch 252, switch 255 is closed and the rotation of the main cam-gear 110 proceeds uninterrupted. The cam follower button 232 follows the inner arcuate wall 132 of the depression 16 while, also immediately upon initiation of rotation of said main cam-gear 110, the lift pin 224 ascends from the depression 123 in outer groove 122 to raise the stylus arm 18 vertically, lifting the stylus from the record surface.

When the cam follower button 232 reaches the arcuate side wall 136, it travels therealong carrying with it the spring arm 230 and thus causing the stylus arm 18 to be swung radially outward from the central axis of the turntable 40. In its travel toward the periphery of the cam-gear 110, the cam follower button 232 passes up and through the ramp 140 formed in the outer wall 134 to track in the outer groove 122. Actuation of the main cam-gear 110, as earlier related, will initiate the operation of the spindle assembly 48 and cause the drop of the next-to-play record. The relationship of the arcuate side wall 136 and the crank pin 108 is such as to insure return of the stylus arm 18 over the perch before the push-off lever 98 is actuated causing the drop of the next-to-play record. Note that the stylus arm 18 is not set down upon the perch at this time because the main cam-gear has not yet completed one revolution. Thus the stylus arm hovers over the perch with the stylus carried thereabove.

The operations of the driving lever 200, the indexing means 120, and the guiding bracket 220 are repeated as hereinabove described, providing that the next-to-play record which is dropped upon the turntable 40 is one that is ten inches in diameter. The placement of the stylus arm 18 in position to place the stylus upon the proper lead-in groove is identical to that procedure described earlier. Once the placement of the stylus upon the said next-to-play record has been completed, the main cam-gear has traveled through one complete revolution; therefore the switch lever 257 drops into notch 259, opening switch 255, deenergizing the motor 100 and thus stopping the main cam-gear 110.

Should the next-to-play record be one that is twelve inches in diameter, the drop of the record will move the feeler means 145, and particularly, lever 164, whereby to position lug 185 in slot 188 to permit the indexing bracket 146 to rotate until the step 194, which is the next lowest step of stepped portion 154, is presented to the driving lever 200 as the same is dropped vertically by the blade 212. This will permit the driving lever 200 to be driven against the guide bracket 220 at a level lower than that utilized for the ten-inch diameter record, thereby causing the spring arm 230 to pivot and guide the cam follower button 232 into groove or track 126 and also to cause the stylus arm 18 to move radially inward toward the turntable but only the distance required to bring same above the lead-in groove of the twelve-inch record. Completion of the single revolution of the main cam-gear 110 causes the lift pin 224 to descend into depression 123 in outer groove 122 and to lower the stylus in the said lead-in groove, guided, of course by the cam follower button 232 until it drops into the shallow depression 124 from the end of track 126.

As stated earlier, an important feature of the cycling means 120 of the invention comprises means whereby the apparatus is deenergized fully upon completion of play of the last-to-play record of a stack mounted upon the spindle. Further, the said cycling means also incorporates means for determining the occurrence of the drop of said last-to-play record. Such means will now be described, principally in terms of its operation.

Figures 15, 16, 18:
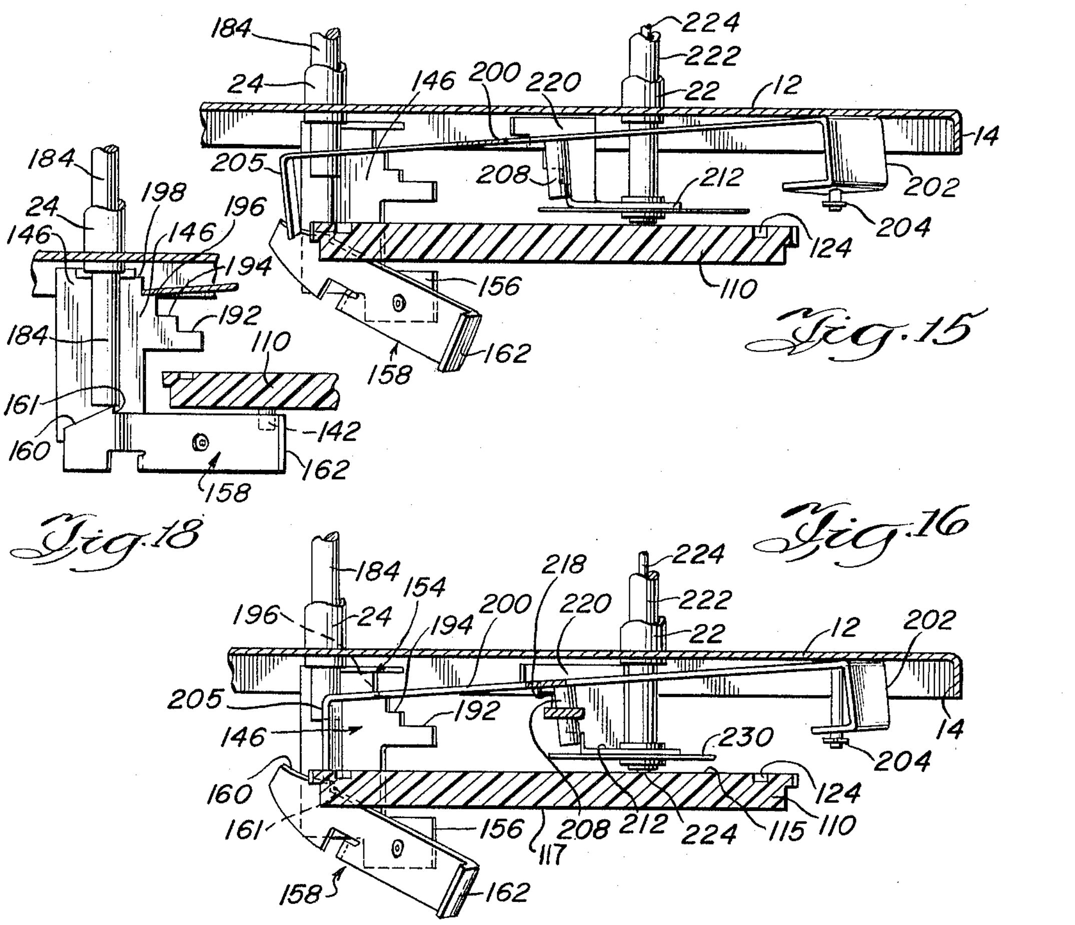
FIG. 15 is a view similar to that of FIG. 14 illustrating the apparatus in the condition shown in FIG. 7.
FIG. 16 is a view similar to that of FIG. 14 but illustrating the apparatus in the condition shown in FIG. 8.
FIG. 18 is a fragmentary view of a portion of FIG. 15 but illustrating the condition assumed by the indexing means of the invention for the play of the last-to-play one of a stack of records.

During normal play of a stack of records, the support rod or shaft 184 of the hold down arm 20 will be disposed above the lever 158, which is pivotally mounted to the indexing bracket 146. Actually the position of said shaft 184 is immediately above the notched end portion 160 thereof. As the records are lowered seriatim and each played, the rod or shaft 184 descends in successive steps. When the last-to-play record has been dropped to the turntable 40, the shaft 184 descends to bear against said lever 158 and pivot same to a condition where said lever 158 is parallel to the cam-gear 110. This condition is fully illustrated in FIG. 18. In this condition, the blade end 162 of lever 158 is interposed in the path of pin 142. As the pin 142 swings arcuately in the course of rotational movement of the main cam-gear 110, the pin 142 bears against the blade end 162, rotates the bracket 146 against its bias, and permits the rod or shaft 184 to drop behind the notch 161. Thus the return rotation or operative rotation of the bracket 146 is prevented and the lowermost step 192 is presented to the driving lever 200. Coincident with the pin 142 bearing against the blade end 162 of lever 158, set-down of the stylus has occurred and play of the said record proceeds. However, the cycling means 120 now is cocked ready for the proper completion of play of said record. Immediately that the play of the record has been completed and the motor 100 energized, the cam-gear 110 is actuated and begins to rotate. The drive lever 200 is lifted by rotation of blade 212 and the drive lever 200 then is lowered vertically to rest upon whatever step of the bracket 146 is presented thereto. The bracket 146, however, has been prevented from rotation by the restraint exercised thereupon by rod 184 engaged behind notch 161; hence, the drive lever 200 is lowered to step 192. Since the level of drive lever 200 is at its lowest condition, the drive lever will be displaced angularly by the action of the cam edge 214 of blade 212 upon pin 108, and the depending arm 205 will bear against the bracket 256 to drive the lug 268 into the path of pin 142. When the pin 142 contacts the lug 268, the bracket 256 is pivoted causing the lever 260 to be released from its locked engagement with lever 262. The lever 262 moves toward its bias and the main switch 284 is opened. Both the turntable motor 62 and the cycling means motor 100 are deenergized. Simultaneously, the main cam-gear 110 has completed one revolution so that both the lift pin 224 and the cam follower button 232 are disposed in the outer groove 122 and the switch lever 257 is disposed within notch 259 of the main cam-gear 110, opening switch 255. The lift pin 224 is thus also disposed within depression 123 in the outer groove 122 and the stylus arm 18 is lowered to rest upon the perch. Immediately upon disengagement of the levers 260 and 262, the tension of spring 288 also causes the actuating lever 34 to pivot in its return path, and, with the stylus arm properly aligned, the hook 32 engages the return-bent bracket 30 to lock the stylus arm 18 down.

Consider now the condition where the speed selector lever 68 has been moved to the position for play of 45 r.p.m. records. These records are formed conventionally of discs of seven-inch diameter. The bell crank lever 80 is pivoted by link 76 to permit the cross arm 82 to clear the slot 171. The bracket 146 is thus free to rotate to its fullest extent and therefor presents the uppermost step 198 to the drive lever 200 when the same is dropped subsequent to lift by lift blade 212. In this manner, the level at which driving lever 200 bears against guide bracket 220 will cause the pivoting of the spring arm 230 and stylus arm 18 to its most radially inward condition with the cam follower button 232 resting upon the track 130 and riding thereupon until dropped to the shallow depression 124. This cycling action will be repeated so long as the hold-down is in place and the speed selector is set to 45 r.p.m. Of course, should a record of the larger, twelve-inch diameter be dropped upon the turntable in this sequence of play, the feeler means 144 would be actuated and then would control the extent of rotation of said indexing bracket 146 and guide bracket 220.

Means are also provided for automatic replay of the last-to-play record and proper set down or placement of the stylus repeatedly until the apparatus is manually deenergized or the hold-down lever 20 is manually replaced telescopically re-engaged through the support shaft 24 to terminate in the notch 161 of lever 158. Such means for automatic replay comprise a portion 306 of the return arm 170 of said feeler means 144 and a flange 314 provided upon the depending arm 187 of the hold-down lever 20. The portion or hold-down guide 306 is provided with a cut-out portion 316 which guides arm 187 and positions the hold-down lever 20 in proper relation to spindle assembly 48. The guide 306 also has a notched shelf 318 and an unnotched shelf 320 separated by cut-out portion 316. The hold-down lever 20 is raised when the automatic replay of the last-to-play record is desired. The underside of flange 314 has a ridge 326 positioned to engage the notch in shelf 318 when flange 314 is placed thereupon. When the hold-down 20 rests by its flange 187 upon shelf 220, the apparatus 10 will automatically replay a seven-inch record, provided the pointer indicates a turntable speed of 45 r.p.m. If the speed is other than 45 r.p.m., then the apparatus will automatically replay a ten-inch record—the set-down positions of the stylus being determined and guided as described earlier.

When the hold-down 20 rests upon notched shelf 218, the ridge 326 is engaged into the notch on shelf 218 and the flange 314 has moved lug 328, said lug 328 being integral with and normal to the return arm 170 of feeler member 145. The movement of said lug 328 displaces feeler member 145 and holds same in its position corresponding to the drop of a twelve-inch record.

Hold-down arm 20 may be removed from shaft 24 and entirely removed from the apparatus. The apparatus then will either continue to play the last-to-play record repeatedly; or be convertible to full manual control.

When automatic deenergization of the player apparatus 10 is desired, the flange 314 is simply lifted from its shelf and the flange 187 permitted to be guided in the cut-out portion 316. The shaft 184 of the hold down arm 20 is permitted to descend. By the procedure described earlier, the player apparatus 10 will then replay the last record and shut off. If desired, the lever 34 may be manually actuated to deenergize the apparatus as well.

It is believed that the invention has been sufficiently described in such detail as to enable those skilled in this art to practice the same, to construct and operate phonographic apparatus embodying the same, and to appreciate and understand the advantages and benefits thereof. Obviously, in a device of this character, many variations are capable of being made without departing from the basic spirit or scope of the invention and without sacrificing the principal advantages thereof.

What it is desired to secure by Letters Patent of the United States is:

1. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, and perch means for supporting the stylus arm in deenergized condition of the apparatus, said perch means having means for locking the stylus arm thereupon during said deenergized condition, said means being releasable upon energization of said apparatus.

2. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam and follower means in a rotary movement, electrical switch means for operating said apparatus in a predetermined and automatically repetitive sequence, and said indexing means includes keying means for distinguishing between the minimum diameter records and records of other diameter, feeler means for distinguishing between those of other diameter records, an indexing bracket responsive sequentially first to said keying means, and second to said feeler means to control the angular displacement of said stylus arm for positioning of same to place the stylus at the proper lead-in groove of the type of record dropped upon the turntable.

3. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, turntable speed selector control means, and cooperative coupling means linking said indexing means to said speed selector control means for placing the indexing means in one condition for a predetermined rate of play and a second condition for speeds other than said predetermined rate.

4. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, said indexing means including feeler means operable, in response to the diameter of the record dropped to the turntable, between at least two conditions, and limiting means operable in response to said conditions to vary the angular displacement of the stylus arm in response to the diameter of said record.

5. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, turntable speed selector control means, cooperative coupling means linking said indexing means to said speed selector control means for placing the indexing means in one condition for a predetermined rate of play and a second condition for speeds other than said rate and said indexing means includes feeler means operable, in response to the diameter of the record dropped to the turntable, between at least two conditions to vary the angular displacement of the stylus arm in response to the diameter of the said record.

6. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, perch means for supporting the stylus arm in de-energized condition of the apparatus, said perch means having means for locking the stylus arm thereupon during said de-energized condition, said means being releasable upon energization of said apparatus and said indexing means comprises an indexing bracket having a stepped edge and mounted for pivotal movement angularly inward toward the cam of said cam and follower means, lug and slot means disposed adjacent said bracket, lever means disposed adjacent each slot of said lug and slot means and adapted selectively to partially block said slot to indicate selected ones of said record diameters, linkage means coupling said lever means with the turntable drive means whereby to cause the said slots selectively to be partially blocked, said bracket operable to present selected steps of said stepped edge to said drive lever means, said drive lever means including a drive lever adapted to be positioned upon a single one of said steps governed by the permitted rotation of said indexing bracket and thereafter to be driven by said cam to bear upon the guide means, including a guide lever, to direct the cam-follower to a preselected position on the cam thereby to cause the stylus arm simultaneously to pivot toward the periphery of the record to be played, said cam carrying means thereupon adapted first to lift and then to set down the stylus arm, and means to permit free movement of said stylus during play; first electrical switch means to energize both motors, second electrical switch means to operate said cycling means independent of said turntable drive means, third electrical switch means adapted to be tripped upon completion of play of said record whereby to energize the motor and cause the cycling means to proceed through one revolution of the cam wheel, whereby to lift the stylus from the record, to return the stylus to the vicinity of the perch, to determine the diameter of the next-to-play record, to cause the next-to-play record to drop to the turntable, and to place the stylus upon the proper lead-in groove of the record responsive to the diameter thereof.

7. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, and said indexing means includes an indexing bracket mounted for rotation adjacent the cam and follower means and having a stepped portion pivoted angularly relative to the periphery of the cam when the bracket is permitted to rotate, means for sensing the diameter of the record being dropped upon the turntable, means for limiting the rotation of the bracket responsive to the position of said sensing means to bring a selected one of said steps in supporting relation to the drive lever means, means for sequentially lifting and dropping the drive lever means upon said selected one of said steps and means for driving the drive lever means against the guide lever means at the position determined by the selected one step whereby to pivot the stylus arm to a position over the record proper to place the stylus in the proper lead-in groove thereof for the diameter of the said record.

8. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, and said cam and follower means includes a driven cam operable independently of the turntable, said cam having concentric groove means at predetermined locations thereon to direct the movement of the stylus arm.

9. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, and said cam and follower means includes a driven cam operable independently of the turntable, said cam having concentric groove means at predetermined locations thereon to direct the movement of the stylus arm, blade means rotatable with the cam to actuate the drive lever means and means associated with said indexing means to control the vertical displacement of the drive lever whereby same bears against the guide means to pivot same one of a group of predetermined degrees selectively controlled by positions of said indexing means.

10. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means including a motor for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, and electrical switch means for operating said apparatus in a predetermined and automatically repetitive sequence, said indexing means including first lever means responsive to the speed selected for the turntable, second lever means responsive to the diameter of the record being dropped to the turntable, bracket means including a stepped portion biased for rotation, placement of a selected one of the steps of said stepped portion in the vertical path of said drive lever means to limit the vertical displacement thereof, thereby to limit the angular displacement of the stylus arm in response to the diameter of the record to be played.

11. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means operable independently of the turntable, to cause, sequentially, the drop of a record to the turntable, thereafter the placement of the stylus on the record at the proper lead-in groove irrespective of the diameter of the record, thereafter to permit the free playing of a record, thereafter to return the sylus to its initial position, and comprising switch means operable to energize and de-energize said cycling means, drive means, including a separate motor, for the cycling means, a cam mounted for rotary movement and driven by said motor, a follower driven by the cam, guide means mounting the stylus arm for pivotal movement and the follower operatively mounted to said guide means for guiding the stylus arm on the cam, groove means on the cam surface for guiding the movement of said follower, means on the cam freeing the stylus arm from the driven controlled movement during play of the record whereby the arm is movable upon the record during play, lever means operable to drive the guide means, means operable with the rotation of the cam to drive the lever means, indexing means operable to limit the displacement of the lever means, sensing means operable to sense the diameter of each record as same is dropped to the turntable and to fix the position of said indexing means, said cam including on the surface thereof means for lifting the stylus arm above the turntable level upon initiation of each cycle and upon completion of play of a record and means to cause recovery of the stylus arm before the drop of the next-to-play record.

12. The invention as claimed in claim 11 wherein grabbler means are provided releasably to lock the stylus arm in a fixed position during de-energized condition of the phonograph, and means are also provided to release the grabbler means upon initiation of the cycle and reengage said grabber means upon completion of the last-to-play record and return of the stylus arm to its initial position.

13. In a phonograph apparatus in which a grooved record is adapted to be rotated and a stylus arranged to follow said groove to vibrate in accordance with the variations of the groove configuration to produce thereby a signal convertible to audible sound, said apparatus including, a turntable for supporting a record; turntable drive means capable of rotating the turntable at a selected one of several different speeds, including an electric motor, camming means for varying the speed of the turntable, speed selector means, including a linkage to said camming means for switching between each of the predetermined speeds, and electrical switch means for energizing and de-energizing said motor; a stylus arm carrying the stylus at one end thereof, the other end being pivotally mounted for radial movement between a pair of limits, means for supporting said stylus arm at said one end when the stylus arm is at its radially outermost limit relative the turntable, spindle means for supporting a stacked plurality of records over the turntable, said spindle means including ledge means for poising one record at a time, sequentially, for drop to the turntable for rotation therewith and lever means for dropping said one record to the turntable synchronously with the movement of the stylus arm to permit said arm to clear the turntable prior to the drop of said record, and cycling means for driving and guiding the stylus arm between said pair of limits and including means for placing the stylus on the record immediately subsequent to the dropping thereof on the turntable, means to permit free movement of the stylus in the groove of the record during play, and means to lift and return the stylus to the radially outermost limit immediately upon completion of play of said last mentioned record and to initiate said spindle means, and particularly the lever means thereof, for the drop of the next-to-play record; the invention which comprises cycling means operable independently of said turntable drive means, including an electric motor, electrical switch means therefor, same being operable independently of said turntable drive means, said cycling means capable of driving and guiding the stylus arm to a position to place the stylus on the dropped record at the proper lead-in groove thereof dependent upon the diameter of said record and irrespective of the intermixture of different record diameters in the said plurality of records.

14. The apparatus as claimed in claim 13 in which said cam and follower means includes a cam driven by said separate motor, said cam having groove means and a shallow depressed portion thereon, said groove means including a plurality of concentric grooves, each spaced radially one from the other and representing a given predetermined proper set down position for the stylus related to the anticipated diameter of the record to be played, each said groove terminating at the said depressed portion.

15. The phonograph apparatus as claimed in claim 13 having a releasable grabber means operatively associated with said support means for the stylus arm to lock down the stylus arm during de-energized condition of the apparatus, to release said stylus arm during energized condition of the apparatus and to re-engage said stylus arm upon completion of the last-to-play one of said records.

16. The phonograph apparatus as claimed in claim 15 wherein said cam also includes an outer groove having a floor and a depression at one location of said floor, and a lift-pin is connected to the stylus arm and is ridable within said outer groove to raise and maintain the stylus arm above the record and engageable within said depression to lower the stylus arm, the annular grooves terminating in a dish-shaped depression formed on the cam and the said outer-groove depression located to cause the lowering of the stylus arm coincident with the follower reaching the termination point of that one groove within which said follower has ridden.

17. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, and said cam and follower means includes a cam driven by said separate motor, said cam having groove means and a shallow depressed portion thereon, said groove means including a plurality of concentric grooves, each spaced radially one from the other and representing a given predetermined proper set down position for the stylus related to the anticipated diameter of the record to be played, each said groove terminating at the said depressed portion.

18. The construction as claimed in claim 17 in which lever means are cooperatively associated with said cam to sense the last-to-play one of said records and to cause the apparatus to become de-energized upon completion of play of said last-to-play record.

19. The construction as claimed in claim 17 in which said concentric grooves are of generally V-shaped configuration.

20. The construction as claimed in claim 19 in which each of said concentric grooves gradually is narrowed along the length thereof.

21. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for drivin the cam of said cam and follower means in a rotary movement, electrical switch means for operating said apparatus in a predetermined and automatically repetitive sequence, and said sensing means is operable in part in response to the speed selected, and, in part, by lever means responsive directly to the diameter of the record to be played.

22. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means, including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: cycling means for operating said apparatus in a coordinated sequence and including indexing means adapted to assume a position responsive to the diameter of the record dropped from said spindle; drive lever means responsive to the position of said indexing means for driving the stylus arm radially inward relative to the turntable; guiding means operated by the drive lever means directing the stylus arm to the proper position for placing the stylus carried thereby upon the proper lead-in groove of the record for the diameter of the record responsive to the indexing means, cam and follower means for controlling the lift of the stylus arm both prior to and upon completion of play of said record and the return pivoting of said stylus arm upon completion of play, drive means, including a separate motor operable independent of the turntable drive means, for driving the cam of said cam and follower means in a rotary movement, electrical switch means for operating said apparatus in a predetermined and automatically repetitive sequence, and the cam of said cam and follower means includes groove means comprising a plurality of concentric annular grooves disposed at predetermined different radial distances from the axis of the cam whereby each represents the radial position relative to the turntable at which the stylus if lowered thereat to the record surface would be properly placed at the lead-in groove for a selected one of several anticipated record diameters, the following adapted to be driven to one of said grooves responsive to the position of said indexing means.

23. The construction as claimed in claim 22 wherein said grooves are of generally V-shaped cross-sectional configuration.

24. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: a cycling mechanism, including a separate electric motor for driving same, said cycling mechanism comprising electrical switch means for selectively, sequentially energizing and de-energizing said mechanism and means for first sensing the diameter of the record being dropped upon the turntable at each cycle and, second, to cause the stylus to be placed on the record at the lead-in groove in accord with the diameter of the record, means for determining the last-to-play record, means for de-energizing said apparatus upon completion of play of said last-to-play record and means biasing the cycling mechanism for proper positioning of the stylus for replay of the last-to-play record regardless of whether said last-to-play record be the only record on the turntable or the top one of a plurality of records of inter-mixed diameter.

25. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: a cycling mechanism, including a separate electric motor for driving same, said cycling mechanism comprising electrical switch means for selectively, sequentially energizing and de-energizing said mechanism and means for first sensing the diameter of the record being dropped upon the turntable at each cycle and, second, to cause the stylus to be placed on the record at the lead-in groove in accord with the diameter of the record, means for determining the last-to-play record, means for de-energizing said apparatus upon completion of play of said last-to-play record and said means for carrying the stack of records includes a removable hold-down arm.

26. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: a cycling mechanism, including a separate electric motor for driving same, said cycling mechanism comprising electrical switch means for selectively, sequentially energizing and de-energizing said mechanism and means for first sensing the diameter of the record being dropped upon the turntable at each cycle and, second, to cause the stylus to be placed on the record at the lead-in groove in accord with the diameter of the record, means for determining the last-to-play record, means for de-energizing said apparatus upon completion of play of said last-to-play record and said switch means is operable remotely from the phonograph apparatus.

27. In a phonograph apparatus in which a grooved record is adapted to be rotated and a stylus is arranged to follow said groove to vibrate in accordance with the variations of the groove configuration to produce thereby a signal amplifiable to audible sound and including, a turntable for supporting said record during play, means including a motor, for driving the turntable at any one of several pre-selected speeds, means, including a spindle assembly, for carrying a stack of records thereon and dropping same seriatim upon said turntable, a pivotal stylus arm for mounting of the stylus; the invention herein comprising: a cycling mechanism, including a separate electric motor for driving same, said cycling mechanism comprising electrical switch means for selectively, sequentially energizing and de-energizing said mechanism and means for first sensing the diameter of the record being dropped upon the turntable at each cycle and, second, to cause the stylus to be placed on the record at the lead-in groove in accord with the diameter of the record, means for determining the last-to-play record, means for de-energizing said apparatus upon completion of play of said last-to-play record and grabber means are provided for automatically locking down the stylus arm when the cycling means is de-energized.

References Cited by the Examiner

UNITED STATES PATENTS

| | | | |
|---|---|---|---|
| 2,159,833 | 5/1939 | Smyth | 274—10 |
| 2,743,109 | 4/1956 | Mullaney | 274—10 |
| 2,794,647 | 6/1957 | Guest | 274—10 |

NORTON ANSHER, *Primary Examiner.*

C. B. PRICE, J. F. PETERS, *Assistant Examiners.*